United States Patent [19]

Gregory et al.

[11] Patent Number: 5,017,208
[45] Date of Patent: * May 21, 1991

[54] APPARATUS FOR FORMING A GROOVE IN A GLASS TUBE

[75] Inventors: Jonathan M. Gregory, Berwick, Me.; Thomas G. Brophy, Gloucester, Mass.

[73] Assignee: GTE Products Corporation, Danvers, Mass.

[*] Notice: The portion of the term of this patent subsequent to May 8, 2007 has been disclaimed.

[21] Appl. No.: 614,559

[22] Filed: Nov. 14, 1990

Related U.S. Application Data

[63] Continuation of Ser. No. 405,923, Sep. 11, 1989, abandoned.

[51] Int. Cl.⁵ ............................................. C03B 27/04
[52] U.S. Cl. ........................................ 65/277; 65/109; 65/283; 65/279; 65/294
[58] Field of Search ................. 65/109, 277, 279, 283, 65/294

[56] References Cited

U.S. PATENT DOCUMENTS

| | | | |
|---|---|---|---|
| 1,948,560 | 2/1934 | Borneman | 65/109 |
| 3,263,852 | 8/1966 | Fridrich | 65/109 X |
| 4,582,523 | 4/1986 | Marcucci et al. | 65/109 |
| 4,585,468 | 4/1986 | Marcucci et al. | 65/277 |
| 4,818,266 | 4/1989 | Sacks et al. | 65/283 X |
| 4,923,498 | 5/1990 | Gregory | 65/109 |

Primary Examiner—Robert L. Lindsay
Attorney, Agent, or Firm—Carlo S. Bessone

[57] ABSTRACT

Apparatus for forming a groove in a glass tube without contacting the glass tube in the groove region. The apparatus includes a pair of chucks for holding opposite ends of the glass tube. The chucks are coupled to a motor for rotating the glass tube about its longitudinal axis. The apparatus further includes one or more torches for noncontact heating of the groove region of the glass tube sufficiently to soften the glass tube in the groove region. The chucks which hold the glass tube are axially movable for stretching and then compressing the glass tube along its longitudinal axis, when the glass tube has been softened in the groove area. The chucks are rotated during heating, stretching and compressing of the glass tube.

23 Claims, 6 Drawing Sheets

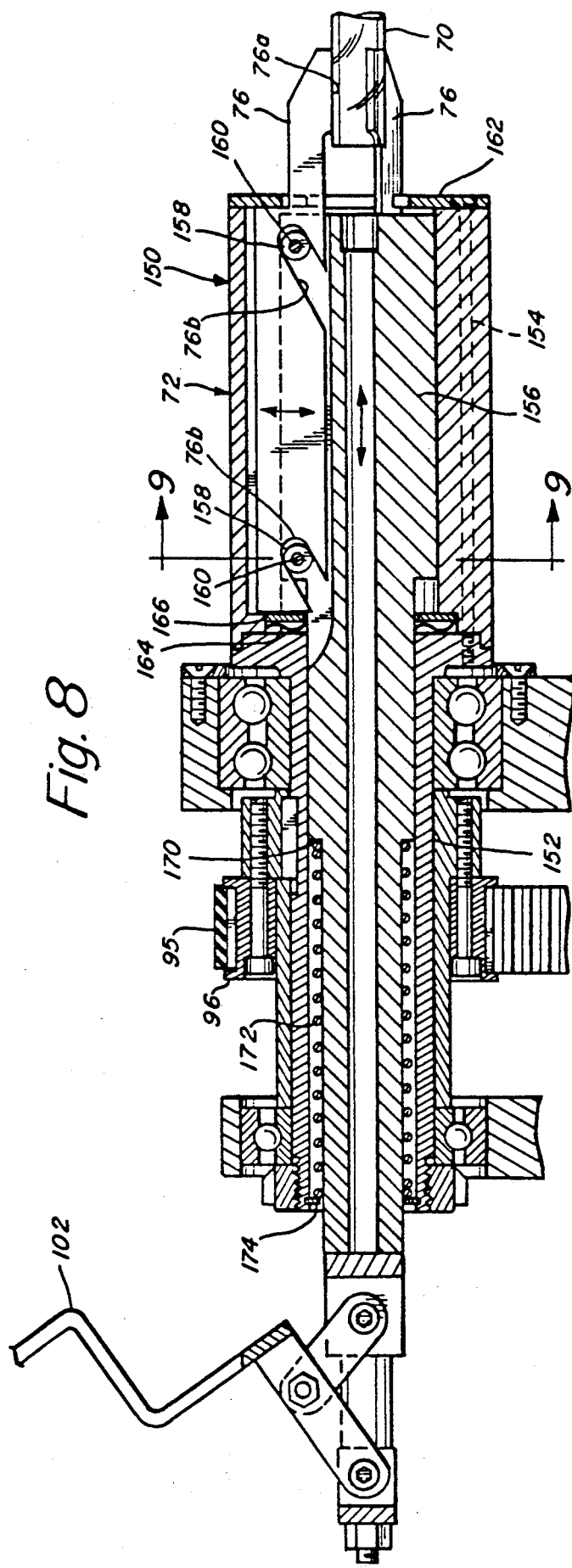

APPARATUS FOR FORMING A GROOVE IN A GLASS TUBE

This is a continuation of co-pending application Ser. No. 07/405,923 filed on Sept. 11, 1989 now abandoned.

CROSS REFERENCE TO RELATED APPLICATION

This application discloses, but does not claim, subject matter which is claimed in U.S. Ser. No. 07/405,922, filed Sept. 11, 1989, now U.S. Pat. No. 4,923,498 and assigned to the assignee of this application.

FIELD OF THE INVENTION

This invention relates to the field of glass working, and more particularly, to an apparatus for forming a groove in a glass tube without physically contacting the glass tube in the groove region. The groove-forming apparatus is typically utilized for forming grooves in electric lamp envelopes, but is not limited to such use.

BACKGROUND OF THE INVENTION

Low pressure discharge lamps, such as fluorescent lamps, include a tubular glass envelope which is usually linear or U-shaped. It has been found desirable to provide the glass tube with one or more grooves in order to increase the light output from the lamp. The use of such grooves is described, for example, in U.S. Pat. No. 4,582,523 issued Apr. 15, 1986 to Marcucci et al and U.S. Pat. No. 4,585,468 issued Apr. 29, 1986 to Marcucci et al. The grooves are formed such that both the inside diameter and the outside diameter of the glass tube are reduced in the groove area. Grooves may be also be formed in glass tubes for decorative purposes or for any other purpose.

The aforementioned Marcucci et al patents describe a groove-forming technique wherein a heated forming wheel is applied to the glass tube as it is rotated. The heated wheel can be used to form one groove at a time, or multiple, heated forming wheels can be utilized to provide multiple grooves simultaneously.

The technique which utilizes one or more heated forming wheels has various shortcomings. The forming wheel must be controlled at the proper temperature to avoid thermal cracks in the glass during grooving. Even if the wheel is maintained at a constant temperature, the glass must be slightly below its softening temperature at the edges of the wheel to insure proper groove shape. Because of the temperature gradient across the width of the groove, the glass is susceptible to thermal cracks. The temperature of the forming wheel must be a compromise between the optimum for the hottest area of the groove and for the relatively cool edges of the groove. If different shapes or groove dimensions are desired, new wheels must be machined, and the wheels on the groove-forming machine must be changed.

In addition, the forming wheel must rotate at the same speed as the glass tube when contact is made and throughout the groove forming process. It is difficult to control rotational speeds consistently in a production setting. The force and speed with which the forming wheel is pressed into the glass tube is critical because microcracks can be caused by excess pressure on the cooler groove edges. The pressure applied to the glass tube becomes more critical as the temperature gradient between the wheel and the glass increases. Thus, the glass is stressed both by pressure and thermal gradients. Finally, oxidation buildup from constant heating of the forming wheel requires special consideration with respect to wheel construction and maintenance.

It is a general object of the present invention to provide an improved apparatus for forming a groove in a glass tube.

It is another object of the present invention to provide an apparatus for forming a groove in a glass tube without physically contacting the glass tube in the groove region.

It is a further object of the present invention to provide an apparatus for forming a groove in a glass tube wherein damage to the glass tube is minimized.

It is yet another object of the present invention to provide an apparatus for forming a groove in a glass tube wherein the dimensions and shape of the groove can be changed without retooling.

It is still another object of the present invention to provide an apparatus for forming a groove in a glass tube which is easily adaptable to high volume production.

It is a further object of the present invention to provide a chuck for holding a glass tube.

SUMMARY OF THE INVENTION

According to the present invention, these and other objects and advantages are achieved in apparatus for forming a groove in a glass tube. The apparatus comprises first means for holding the glass tube and for rotating the glass tube about its longitudinal axis, second means for noncontact heating of a localized area of the glass tube sufficiently to soften the glass tube in the localized area, and third means for successively stretching and then compressing the glass tube along its longitudinal axis when the glass tube has been softened in the localized area.

The first means preferably comprises a first chuck and a second chuck for gripping opposite end portions of the glass tube, and means for rotating the first and second chucks. The noncontacting means preferably includes torch means for heating the localized area of the glass tube and retracting means for moving the torch means between a heating position and a retracted position. In a preferred embodiment, the torch means comprises a pair of torches tangentially directed at the localized area of the glass tube in the heating position. The second means preferably further includes positioning means for moving the torch means to different axially positions along the glass tube. The first and second chucks are preferably mounted on axially movable carriages. The torch means is preferably mounted on an axially movable heating carriage.

In operation, a glass tube is mounted in the apparatus with the first and second chucks gripping opposite end portions thereof. The glass tube is then rotated and is heated by the torch means and the localized area. When the glass tube has been softened in the localized area, the first and second chucks are pulled apart by a predetermined distance. After a predetermined time on the order of one second or less, the chucks are axially pushed together to form a groove in the localized area of the glass tube. The size and shape of the groove can be controlled by varying the amount of heating and the push/pull distances.

According to another aspect of the invention, there is provided a chuck for holding a tube, such as a glass tube. The chuck comprises a housing, at least three jaws positioned around an axis, the jaws including tube-gripping portions and being radially movable in the housing, a draw bar that is axially movable in the housing between a clamp position and a release position, and means for interconnecting the draw bar and the jaws such that the jaws move radially inward as the draw bar moves from the release position to the clamp position.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 8 is a cross-sectional view of the chuck for holding the glass tube taken along the line 8—8 of FIG. 7; and FIG. 9 is a cross-sectional view of the chuck taken along the line 9—9 of FIG. 8.

DETAILED DESCRIPTION OF THE INVENTION

Figure 1:
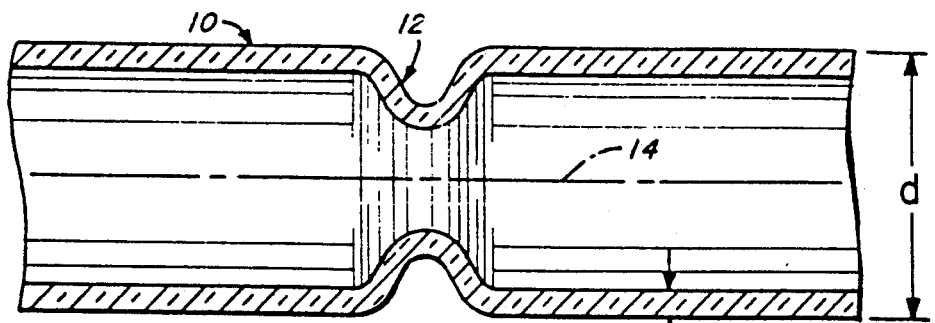
FIG. 1 is a cross-section of a glass tube in which a groove has been formed.

A cross-sectional view of a glass tube 10 having a groove 12 is shown in FIG. 1. The glass tube 10 typically has an outside diameter in the range of about ⅜ inch to one inch. The wall thickness t is typically in the range of about 0.025 inch to 0.070 inch. However, grooves can be formed in glass tubes having dimensions outside these ranges in accordance with the present invention. In the groove 12, both the outside diameter and the inside diameter of glass tube 10 are reduced. In a typical groove, the inside diameter is reduced by about one-half. The groove 12 can have a variety of shapes, depending on the parameters of the forming process as described hereinafter. In addition, the wall thickness t can be maintained constant, increased or decreased in the region of groove 12. The glass tube 10 has a longitudinal axis 14, and the groove 12 is concentric with axis 14. Multiple grooves can be formed at axially spaced-apart locations on glass tube 10.

The present invention provides a technique for forming groove 12 without the use of a heated wheel and without physical contact with the glass tube 10 in the region of groove 12. As a result, the disadvantages associated with the use of a heated forming wheel are eliminated.

Figure 2:
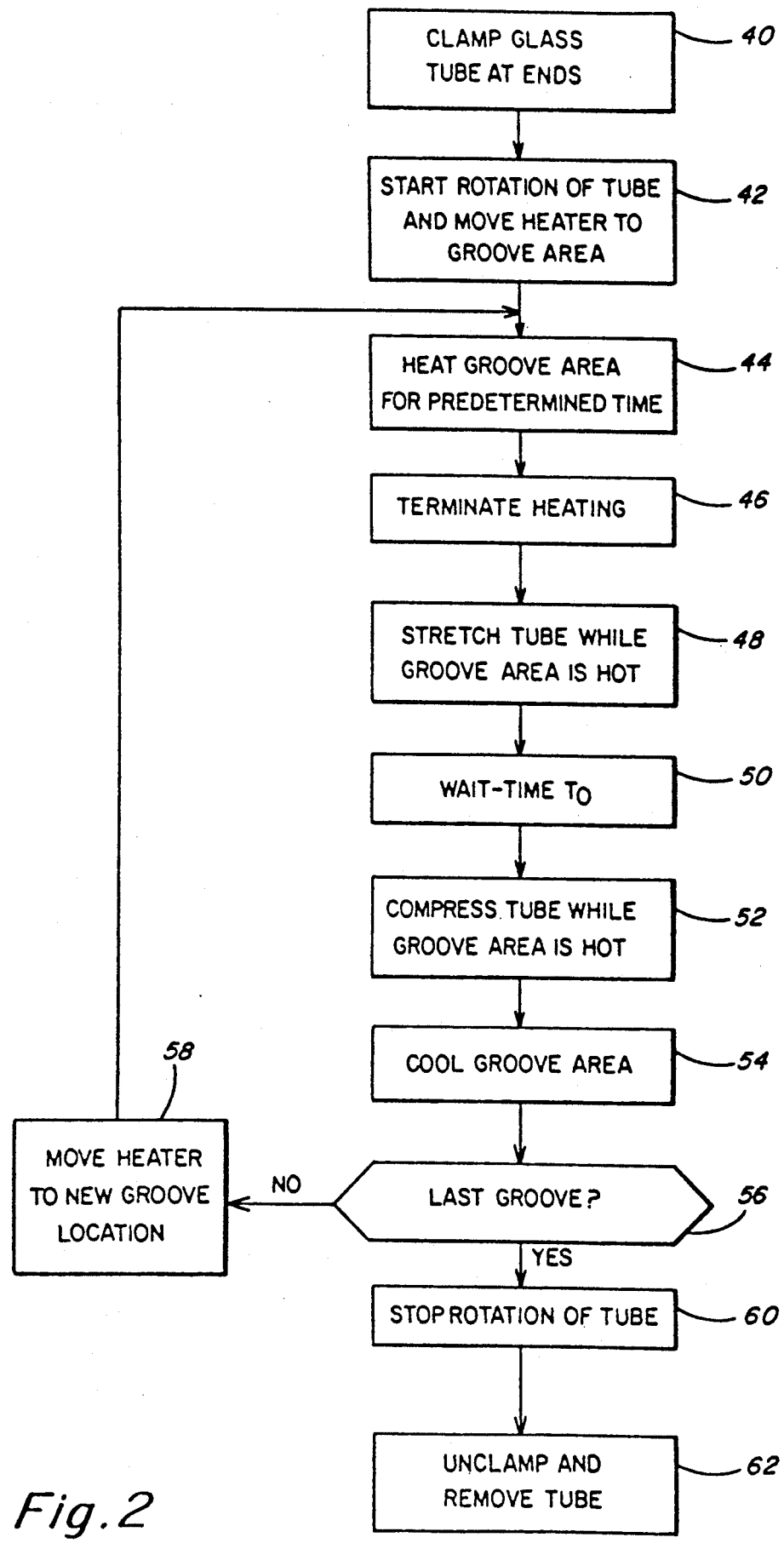
FIG. 2 is a flow chart showing the steps involved in formation of a groove in accordance with the present invention.

The technique for forming groove 12 is illustrated in the flow chart of FIG. 2. In step 40, the ungrooved glass tube is clamped at each end. The clamping should provide lateral support for the glass tube so that it will not sag or otherwise deform when the groove region is softened by heating. Glass chucks are preferably used for clamping, as described hereinafter. Next, the glass tube is rotated about its longitudinal axis in step 42, and a heater is moved to the area of the tube where a groove is desired. The tube 10 is rotated about longitudinal axis 14 for the remainder of the groove-forming steps. A typical rotation rate is about 200 RPM. However, other rotation rates can be utilized.

The groove area of the tube is then heated to above the softening temperature of the glass in step 44. The tube is preferably heated by one or more narrow burner flames, each produced by a torch and directed at the groove region. A narrow flame limits the softened region to the desired groove location. As the glass softens in the groove area, the chucks must insure that both ends of the glass tube rotate at exactly the same speed to avoid twisting. Also, the chucks must clamp each end of the glass tube in such a manner as to maintain the longitudinal axis 14 in a straight line when the heated area softens and the tube essentially becomes two parts for handling purposes. The amount of heat applied to the tube must be sufficient to soften the tube in the groove area without causing it to liquefy. The glass tube temperature in the groove area can be controlled by applying heat for a predetermined time, typically on the order of about 3-10 seconds depending on the dimensions of the tube and the intensity of the flame. Alternatively, the applied heat can be controlled in response to sensing the temperature of the glass tube in the groove area. When the glass in the groove area is sufficiently softened, heating is terminated in step 46.

Figure 3:
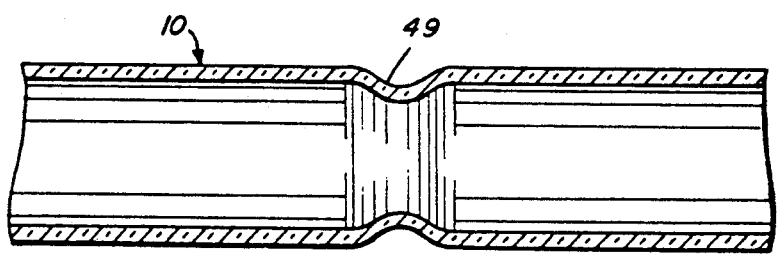
FIG. 3 is an illustration of a glass tube after axial stretching but before axial compression.

The tube 10 is then stretched axially in step 48 while the groove area is hot by pulling both ends of the tube axially and simultaneously. Rotation of the tube continues during stretching. When the tube is stretched, the glass in the heated groove area is reduced in diameter, as indicated in FIG. 3 by the reference number 49. The distance that the glass is stretched and the viscosity of glass in the heated area determine the reduction in diameter. Typically, the glass tube is stretched by about ¼ inch. However, other stretch distances can be utilized depending on the dimensions of the glass tube and the required parameters of the groove. The tube is maintained in the stretched position for a predetermined short wait time $T_0$ (step 50). The wait time $T_0$ is usually less than one second and is preferably about 200 milliseconds. Then, without reheating of the tube, but while the groove area is still hot, the tube is axially compressed in step 52 by pushing the ends of the tube together. The axial compression produces a well-defined groove in the heated groove area. The wait time $T_0$ permits partial cooling of the groove area before the tube is axially compressed and prevents the sides of the groove from fusing together. In cases where fusing of the groove sides is acceptable, the wait time $T_0$ can be omitted. The distance that the ends of the glass tube are pushed together affects the groove shape, tube wall thickness and final diameter of the groove 12.

After compression, the groove area can be actively cooled in step 54 to provide rapid solidification of the groove area. The active cooling step can be eliminated in cases where slower cooling is acceptable. In step 56, a determination is made whether the previously-formed groove was the last required groove. If another groove is required, the heater is moved in step 58 to a new groove location, and steps 44, 46, 48, 50, 52 and 54 are repeated at the new groove location. When the previously-formed groove was the last required groove, rotation of the tube is stopped in step 60, and the tube is unclamped and removed in step 62.

The active forced air cooling of step 54 is used to quickly increase the viscosity of the glass in the groove region in order to set the groove shape. A controlled and consistent cooling rate insures the repeatability of groove shapes and dimensions. Application of cooling air for approximately ½ second causes sufficient cooling to set the groove.

Figure 4A:
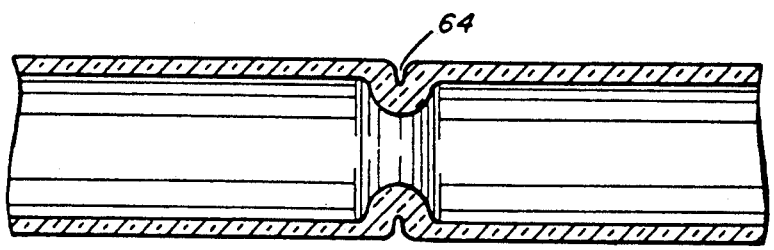
FIGS. 4A-4C are cross-sectional views of glass tubes having grooves formed in accordance with the present invention, for different relative push/pull distances.
Figure 4B:
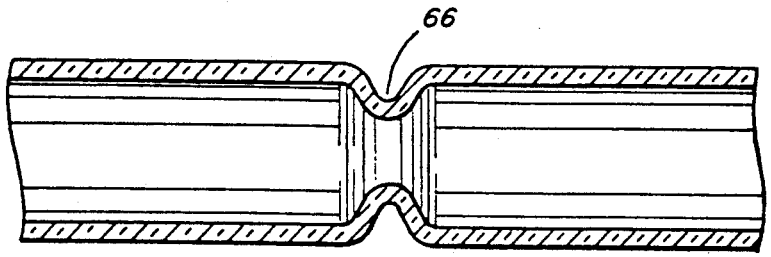
Figure 4C:
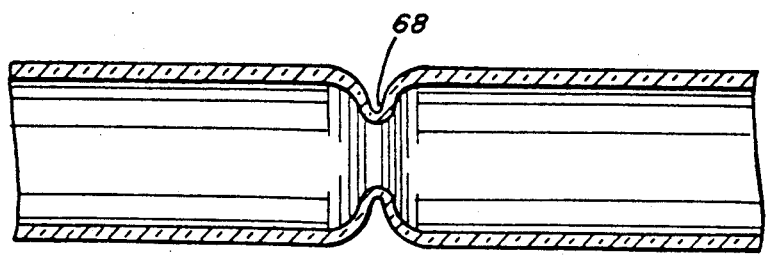

When the ends of the glass tube are pushed in by a greater distance than they are pulled out during the groove-forming process, the wall thickness in the groove area is increased and the inside diameter of the groove is reduced, as indicated by groove 64 in FIG. 4A. When the pull and push distances are equal, the tube wall thickness does not change in the groove area, as indicated by groove 66 in FIG. 4B. The groove shape and diameter can be adjusted by altering the amount of heating and thereby controlling the glass viscosity. The wall thickness is reduced in the groove region when the pull distance is greater than the push distance, as indicated by groove 68 in FIG. 4C.

Figure 5:
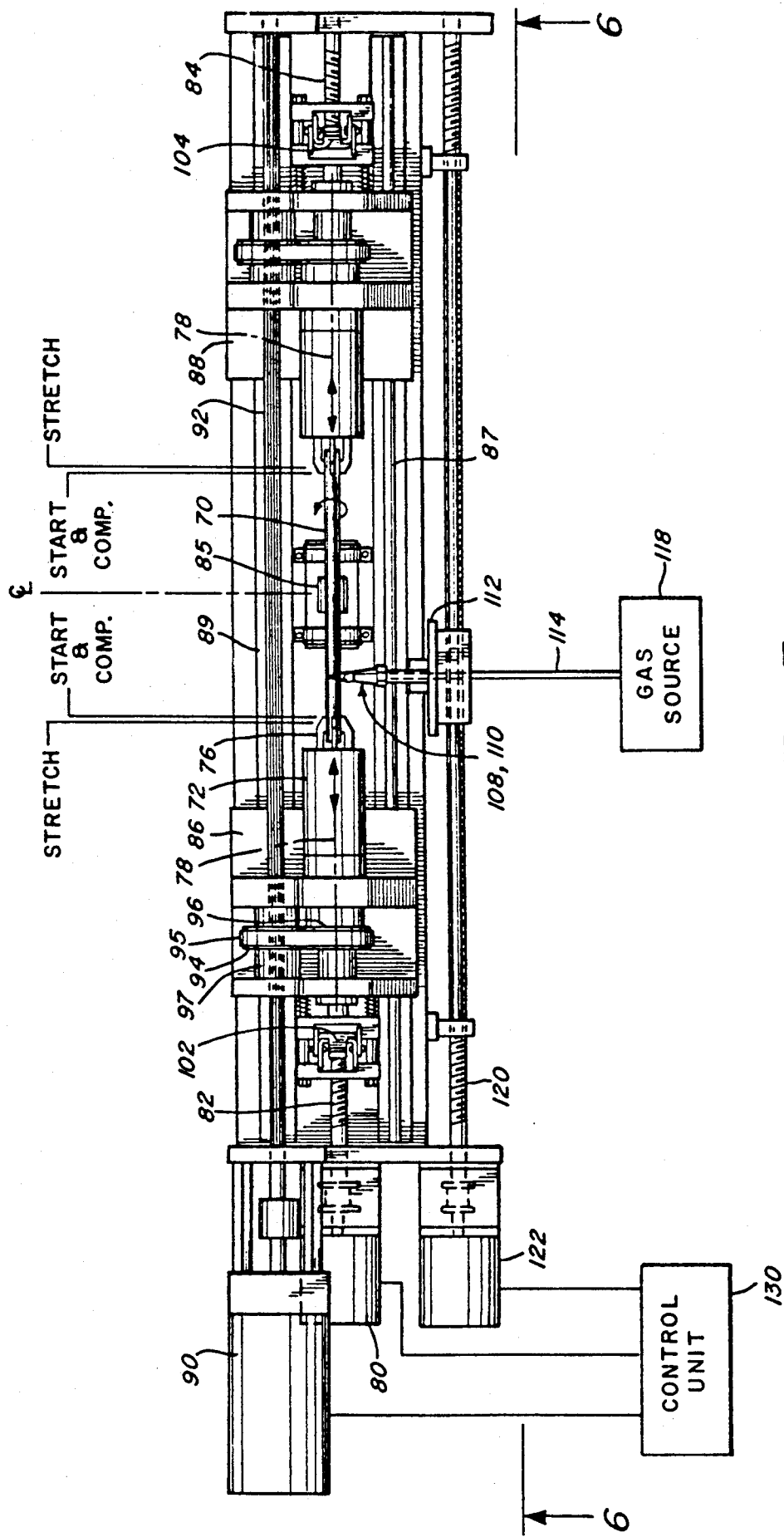
FIG. 5 is a plan view of a machine for forming grooves in a glass tube.
Figure 6:
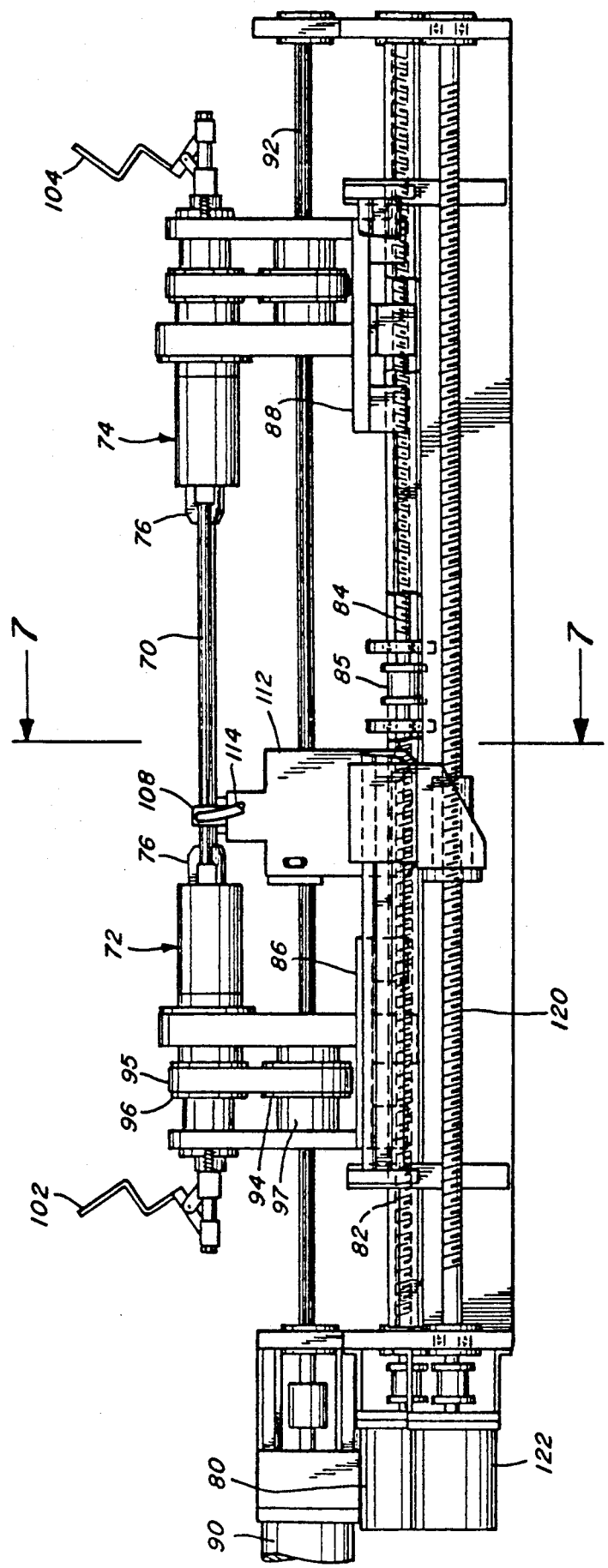
FIG. 6 is a partially broken-away plan view of the machine taken along the line 6—6 of FIG. 5.
Figure 7:
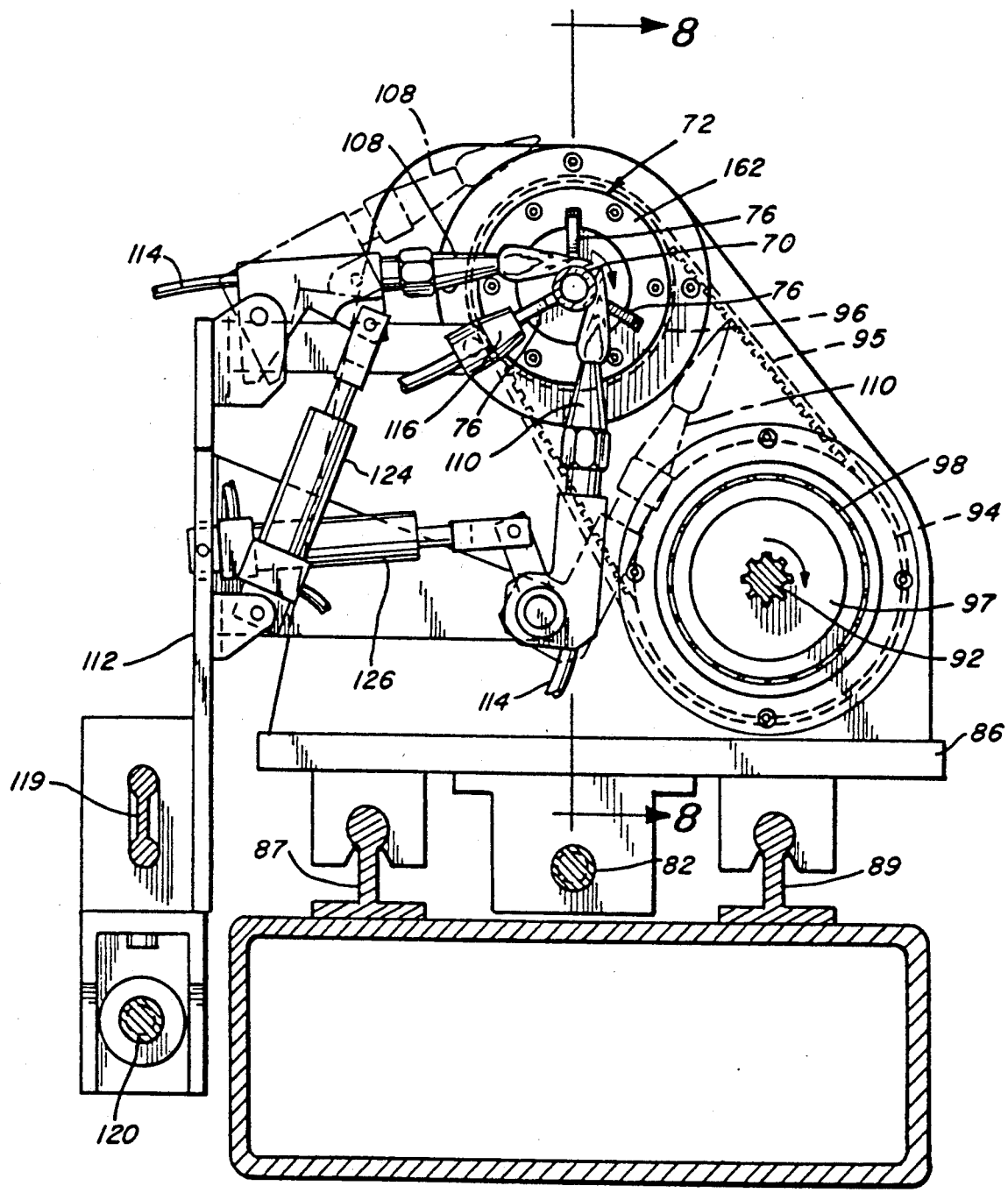
FIG. 7 is a cross-sectional view of the machine taken along the line 7—7 of FIG. 6.

An apparatus for forming grooves in a glass tube according to the method described above is shown in FIG. 5–7. A glass tube 70 is clamped at each end by chucks 72 and 74 having jaws 76. The chucks 72 and 74 are axially movable along an axis 78, which is the longitudinal axis of glass tube 70. The apparatus is constructed so that axial movements of chucks 72 and 74 are equal in magnitude and opposite in direction. The chucks 72 and 74 can also be rotated about axis 78. The chucks 72 and 74 rotate in the same direction at equal speeds.

A stepper motor 80 is connected to a lead screw 82. The lead screw 82 is connected by a coupler 85 to a lead screw 84. The lead screws 82 and 84 are oppositely threaded to provide axial movement of chucks 72 and 74 in opposite directions when stepper motor 80 is energized. Chuck 72 is mounted on a carriage 86 having a ball nut coupled to lead screw 82. Chuck 74 is mounted on a carriage 88 having a ball nut attached to lead screw 84. The carriages 86 and 88 are axially movable along rails 87 and 89. When stepper motor 80 is energized, carriages 86 and 88 are moved along axis 78 toward each other or away from each other by lead screws 82 and 84, respectively.

The rotation of chucks 72 and 74 is controlled by a motor 90 connected to a spline shaft 92. A toothed pulley 94 mounted on spline shaft 92 and a toothed pulley 96 mounted to chuck 72 transmit rotation via a belt 95 from motor 90 to chuck 72. The pulley 94, which is mounted by a bearing 98 on a spline shaft follower 97, moves axially along spline shaft 92 with carriage 86. A similar set of pulleys interconnecting spline shaft 92 and chuck 74 cause rotation of chuck 74. The jaws 76 can be opened manually by levers 102 and 104, respectively, to release the glass tube 70.

Torches 108 and 110 are mounted on a carriage 112. The torches 108 and 110 are connected by a flexible tube 114 to a flammable gas source 118. An air cooling nozzle 116 is also mounted on carriage 112. The air nozzle 116 is connected by a flexible tube to a source of pressurized cooling air (not shown). The carriage 112 is axially movable along a rail 119 and is coupled by a ball nut to a lead screw 120. The lead screw 120 is connected to a stepper motor 122. When the stepper motor 122 is energized, the carriage 112 moves along lead screw 120 parallel to tube 70 for positioning of torches 108 and 110 and air nozzle 116 at the desired groove location on tube 70. Torches 108 and 110 are mounted to carriage 112 by air cylinders 124 and 126, respectively. The air cylinders 124 and 126 control movement of torches 108 and 110 between heating positions and retracted positions (shown in phantom in FIG. 7). When the torches 108 and 110 are in their respective heating positions, they are directed tangentially with respect to the glass tube 70 to provide rapid heating of the localized groove area.

The stepper motors 80 and 122, the motor 90, and the air cylinders 124 and 126 are energized by a programmable control unit 130. The control unit 130 causes the apparatus to execute the routine shown in FIG. 2 and described in detail hereinabove.

Cross-sectional views of the chuck 72 are shown in FIGS. 8 and 9. The chuck 74 is the same as chuck 72. The chuck includes three spring-activated jaws 76. The chuck is able to grasp and centralize glass tubes of different diameters with a predetermined clamping force. The glass tube is rigidly held as it is being rotated. A line contact is formed between an inside surface 76a of each jaw 76 and the glass tube. Three line contacts insure that the central portion of the glass tube does not collapse when the groove region is heated above the softening temperature of the glass. The chuck includes housing members 150 and 152 interconnected by bolts 154. A draw bar 156 is grooved and cross drilled to accept six free-turning rollers 158 and six hardened pins 160. Three hardened jaws 76 are positioned in grooves in housing member 150 and draw bar 156. A retainer plate 162 prevents lateral motion of jaws 76. A wave spring 164 and a hardened thrust washer 166 bear on the inner ends of jaws 76 to maintain contact between jaws 76 and retainer plate 162, while allowing radial movement of the jaws 76. The draw bar 156 is provided with a shoulder 170. A chuck-operating spring 172 bears against the shoulder 170 and a snap ring 174.

The draw bar 156 is retracted so that the operating spring 172 is compressed. Rollers 158, acting on inclined slots 76b in jaws 76, force the jaws to open so that the glass tube can be inserted. As the draw bar 156 is released, the operating spring 172 forces the draw bar forward, causing rollers 158 to transfer motion of the draw bar to jaws 76 through the lower edges of the slots 76b, thereby causing the jaws 76 to clamp the glass tube. The relatively long length of the operating spring 172 in comparison to the motion of the draw bar 156 produces a relatively small variation in clamping force for different diameter tubes.

In operation, the glass tube 70 is mounted in chucks 72 and 74 by manual operation of levers 102 and 104, and motor 90 is energized, thereby causing rotation of tube 70. The stepper motor 122 is energized, causing the carriage 112 to be positioned adjacent to the desired groove area on tube 70. Air cylinders 124 and 126 are then actuated, causing torches 108 and 110 to be moved to their heating positions for heating of the groove region of tube 70. After a predetermined heating time, torches 108 and 110 are retracted, and stepper motor 80 is energized in one direction, causing chucks 72 and 74 to pull the ends of tube 70 by a predetermined distance. After a predetermined wait time $T_0$, stepper motor 80 is energized in the opposite direction, causing chucks 72 and 74 to push the ends of glass tube 70 together. As a result, the desired groove is formed. Then air nozzle 116 is activated, causing cooling air to be directed at the grooves are required, the motor 122 is energized, causing carriage 112 to be moved to the new groove location. The above-described process is then repeated.

After the required grooves have been formed in glass tube 70, the tube is removed from the chucks 72 and 74.

It will be understood that different configurations can be utilized for the groove-forming apparatus. The principal requirements of the apparatus are for a means for rotating the glass tube, a noncontact means for heating the groove region of the glass tube, and means for axial stretching and compression of the heated tube.

The groove forming technique of the present invention eliminates problems of cracking associated with use of the heated forming wheel, since the glass is not physically contacted in the groove region during groove formation. Grooves are formed using noncontact heating and axial forces at the cool ends of the glass tube. A wide variety of groove shapes and dimensions can be obtained without retooling merely by changing the heating times and the push/pull parameters. The tube wall thickness can be increased or decreased in the groove region by varying the relative push/pull distances. As a result, the stregth of the bulb and the heat transfer characteristics in the groove region can be altered.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Apparatus for forming a groove in a glass tube, comprising:
    first means for holding the glass tube and for rotating the glass tube about its longitudinal axis, said first means comprising a first mechanical chuck and a second mechanical chuck for gripping opposite end portions of the glass tube;
    second means for noncontact heating of a localized area of the glass tube sufficiently to soften the glass tube in the localized area; and
    third means for successively stretching and then compressing the glass tube along its longitudinal axis when the glass tube has been softened in the localized area, said third means comprising mechanical means for axially and simultaneously moving said first and second chucks by equal distances in opposite directions.

2. Groove-forming apparatus as defined in claim 1 wherein said first means comprises means for rotating said first and second chucks.

3. Groove-forming apparatus as defined in claim 2 wherein said first and second chucks each include three jaws for gripping said glass tube and means for urging said jaws against said glass tube.

4. Groove-forming apparatus as defined in claim 3 wherein each of said jaws forms a line contact with said glass tube.

5. Groove-forming apparatus as defined in claim 2 wherein said means for rotating said first and second chucks includes a single motor and means for coupling said motor to said first and second chucks so that said first and second chucks rotate in the same direction at equal speeds.

6. Groove-forming apparatus as defined in claim 1 wherein said means for axially moving said first and second chucks includes a motor, a first lead screw coupled between said motor and said first chuck and a second lead screw coupled between said motor and said second chuck, said first and second lead screws being oppositely threaded to provide movement of said first and second chucks in opposite directions.

7. Groove-forming apparatus as defined in claim 6 wherein said first chuck is mounted on a first carriage coupled through a first ball nut to said first lead screw, and said second chuck is mounted on a second carriage coupled by a second ball nut to said second lead screw.

8. Groove-forming apparatus as defined in claim 7 wherein said means for rotating said chucks includes a motor, a spline shaft coupled to said motor, first pulley means for coupling rotation of said spline shaft to said first chuck and second pulley means for coupling rotation of said spline shaft to said second chuck.

9. Groove-forming apparatus as defined in claim 2 wherein said second means includes torch means for heating the localized area of the glass tube.

10. Groove-forming apparatus as defined in claim 9 further including retracting means for moving said torch means between a heating position for heating of the localized area of the glass tube and a retracted position.

11. Groove-forming apparatus as defined in claim 10 wherein said torch means comprises a pair of torches tangentially directed at the localized area of the glass tube in the heating position.

12. Groove-forming apparatus as defined in claim 9 wherein said second means further includes positioning means for moving said torch means to different axial positions along said glass tube.

13. Groove-forming apparatus as defined in claim 12 wherein said positioning means includes a motor and a lead screw coupled to said motor and coupled through a ball nut to said torch means, whereby said torch means moves axially when said motor is energized.

14. Groove-forming apparatus as defined in claim 13 wherein said second means further includes a heating carriage for mounting of said torch means, said ball nut being coupled between said lead screw and said heating carriage.

15. Groove-forming apparatus as defined in claim 1 further includes means for cooling the localized region of the glass tube after formation of a groove.

16. Groove-forming apparatus as defined in claim 15 wherein said means for cooling comprises means for directing cooling air at the localized region of the glass tube.

17. Groove-forming apparatus as defined in claim 2 wherein said first and second chucks each include means for gripping the glass tube so as to maintain the longitudinal axis thereof in a substantially straight line when the glass tube is softened in the localized area.

18. Apparatus for forming a groove in a glass tube, comprising:
    a first mechanical chuck and a second mechanical chuck for gripping end portions of the glass tube;
    means for rotating said first and second chucks about an axis;
    means for noncontact heating of a localized area of the glass tube sufficiently to soften the glass tube in the localized area;
    means for transporting the heating means to different localized areas of the glass tube;
    mechanical means for moving the first and second chucks along said axis in opposite directions for successively stretching and compressing the glass tube comprising mechanical means for axially and simultaneously moving said first and second chucks by equal distances in opposite directions; and programmable control means for controlling rotation and axial movement of said first and second chucks and for controlling heating of the glass tube.

19. Groove-forming apparatus as defined in claim 18 wherein said first and second chucks each include three jaws for gripping said glass tube and means for urging said jaws against said glass tube.

20. Groove-forming apparatus as defined in claim 19 wherein each of said jaws forms a line contact with said tube.

21. Groove-forming apparatus as defined in claim 18 wherein said first and second chucks each include means for gripping the glass tube so as to maintain the longitudinal axis thereof in a substantially straight line when the glass tube is softened in the localized area.

22. Groove-forming apparatus as defined in claim 18 wherein said noncontact heating means includes torch means.

23. Groove-forming apparatus as defined in claim 18 further including means for cooling the localized region of the glass tube after formation of a groove.

* * * * *